United States Patent
Clements et al.

(10) Patent No.: US 10,838,534 B2
(45) Date of Patent: Nov. 17, 2020

(54) MULTI-AXIS FORCE SENSOR

(71) Applicant: Microsoft Technology Licensing, LLC, Redmond, WA (US)

(72) Inventors: Bradley Edgar Clements, Fort Collins, CO (US); Michael Dale Jensen, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 15/824,801

(22) Filed: Nov. 28, 2017

(65) Prior Publication Data

US 2019/0163310 A1    May 30, 2019

(51) Int. Cl.
| | |
|---|---|
| *B43K 29/00* | (2006.01) |
| *B43K 7/00* | (2006.01) |
| *B43K 8/22* | (2006.01) |
| *G06F 3/041* | (2006.01) |
| *G06F 3/0354* | (2013.01) |
| *G06F 3/038* | (2013.01) |
| *G06F 3/044* | (2006.01) |
| *B41J 13/10* | (2006.01) |

(52) U.S. Cl.
CPC ........ *G06F 3/0414* (2013.01); *G06F 3/03545* (2013.01); *G06F 3/0416* (2013.01)

(58) Field of Classification Search
CPC ............... B43K 8/22; B43K 29/08; G06F 3/0346–03542; G06F 3/033; G06F 3/041–045; A61N 5/0616
See application file for complete search history.

(56) References Cited

U.S. PATENT DOCUMENTS

| | | | | |
|---|---|---|---|---|
| 4,726,044 A | * | 2/1988 | Perna | B43K 7/00 136/291 |
| 4,768,040 A | * | 8/1988 | Pipkin | B43K 8/22 346/14 R |
| 6,633,282 B1 | * | 10/2003 | Monroe | G06F 3/03545 178/19.03 |
| 2002/0134594 A1 | * | 9/2002 | Taylor | G06F 3/0346 178/18.01 |
| 2007/0014490 A1 | * | 1/2007 | Silverbrook | B41J 13/106 382/313 |

(Continued)

OTHER PUBLICATIONS

"International Search Report and Written Opinion Issued in PCT Application No. PCT/US18/060212", dated Feb. 22, 2019, 11 Pages.

*Primary Examiner* — Lin Li
(74) *Attorney, Agent, or Firm* — Holzer Patel Drennan

(57) ABSTRACT

An electronic stylus device includes a stylus tip element having a stylus tip end and an opposing end. The stylus tip element is positioned at an end of the electronic stylus device and aligned along the long center axis of the electronic stylus device. A nutation collar is positioned about the stylus tip element and the long center axis. The nutation collar provides one or more bearing surfaces around the stylus tip element between the stylus tip end and the opposing end of the stylus tip element. The one or more bearing surfaces permit the stylus tip element to nutate within the nutation collar. A deflection sensor is positioned proximate to the opposing end of the stylus tip element on the long center axis and detects lateral deflection of the opposing end of the stylus tip element relative to the long center axis of the electronic stylus device.

20 Claims, 7 Drawing Sheets

(56) References Cited

U.S. PATENT DOCUMENTS

| | | | |
|---|---|---|---|
| 2007/0025805 A1* | 2/2007 | Lapstun | B43K 29/004 |
| | | | 401/195 |
| 2014/0028633 A1* | 1/2014 | Mercea | G06F 3/0383 |
| | | | 345/179 |
| 2015/0054757 A1* | 2/2015 | Kuroda | G06F 3/0386 |
| | | | 345/173 |
| 2016/0311244 A1* | 10/2016 | Pullaro, Jr. | B43K 29/08 |
| 2017/0068345 A1* | 3/2017 | Barel | G06F 3/045 |
| 2017/0228051 A1* | 8/2017 | Wu | G06F 3/044 |
| 2017/0242502 A1 | 8/2017 | Gray et al. | |
| 2017/0308189 A1* | 10/2017 | Peretz | G06F 3/0414 |

* cited by examiner

MULTI-AXIS FORCE SENSOR

BACKGROUND

Accurate approximation of force magnitude applied by an electronic stylus tip normal to an inking surface (e.g., a tablet display) plays a part in determining how to render the ink in the corresponding display. For example, the greater the force applied to the display by the stylus tip, the thicker or darker the rendered ink will be displayed. In some technologies, the force on the inking surface is approximated using a measurement of the opposing force applied to the electronic stylus tip, which is typically measured along the axis of the electronic stylus device. However, long axis force measurement only limits the accuracy of the approximation of the force applied by the stylus tip.

SUMMARY

Implementations described herein provide an electronic stylus device includes a stylus tip element having a stylus tip end and an opposing end. The stylus tip element is positioned at an end of the electronic stylus device and aligned along the long center axis of the electronic stylus device. A nutation collar is positioned about the stylus tip element and the long center axis. The nutation collar provides one or more bearing surfaces around the stylus tip element between the stylus tip end and the opposing end of the stylus tip element. The one or more bearing surfaces permit the stylus tip element to nutate within the nutation collar. A deflection sensor is positioned proximate to the opposing end of the stylus tip element on the long center axis and detects lateral deflection of the opposing end of the stylus tip element relative to the long center axis of the electronic stylus device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

BRIEF DESCRIPTIONS OF THE DRAWINGS

DETAILED DESCRIPTIONS

Accurate detection of force magnitude applied to an electronic stylus tip against an inking surface plays a part in determining how to render the ink in the corresponding display. An inking system in the host device (e.g., a tablet computer) can translate a force that a stylus detects tip force along a long axis of the stylus (e.g., an axis from the stylus tip to the opposite end of the stylus) into corresponding force applied to the inking surface of the host device. However, when the long axis of the stylus is not orthogonal to the inking surface, the force on the inking surface is approximated using the long axis force detected by the stylus in combination with other factors, including without limitation stylus angle with respect to the inking surface and tip movement across the inking surface.

Nevertheless, different uses or states of an electronic stylus device can be more or less dependent on the accuracy of such an approximation. For example, a stylus being used like a ballpoint pen is typically at a 50°-90° angle with respect to the display and, therefore, accurate inking is primarily dependent on the long axis stylus force (which in itself is a close approximation to the inking surface force). In contrast, an electronic stylus device being used like an artistic shading pencil is typically at less than a 45° angle with the display and, therefore, accurate inking has a greater dependence on stylus force that is not aligned with the long axis of the electronic stylus device.

Figure 1:
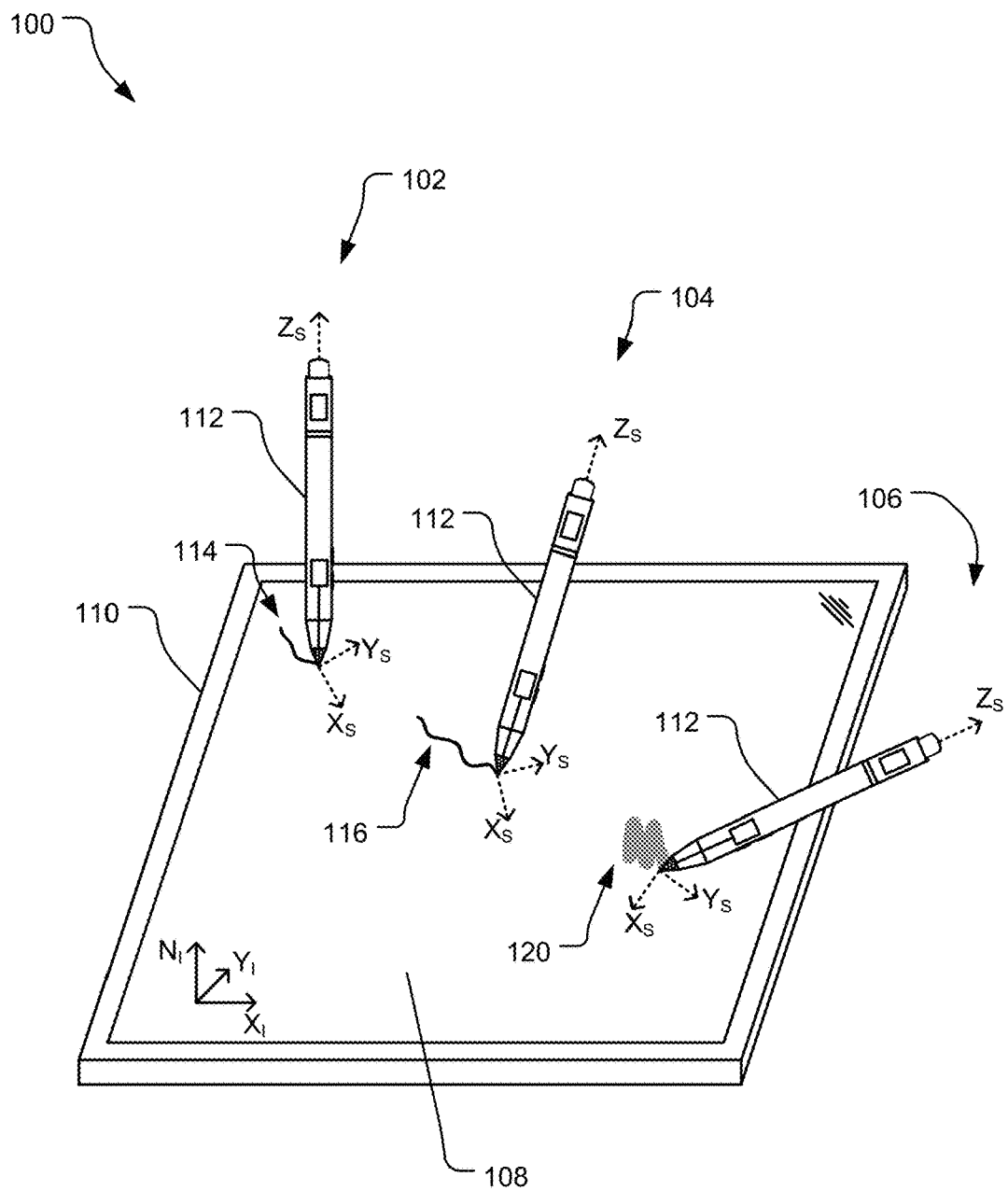
FIG. 1 illustrates an example electronic stylus environment in three different usage states.

FIG. 1 illustrates an example electronic stylus environment 100 in three different usage states 102, 104, and 106. The three states 102, 104, and 106 are illustrated with reference to an inking surface 108 (e.g., a digitizer surface and/or display surface) of a host computing device 110. The inking surface 108 has an X-axis ($X_I$) and a Y-axis ($Y_I$) in a plane that is orthogonal to a Z-axis (a normal axis $N_I$). By determining the axial force (i.e., along the long center axis $Z_S$ of the electronic stylus device) and the lateral forces (e.g., orthogonal to the axial force), the electronic stylus device and/or the host computing device 110 can more accurately compute the inking force on $N_I$ of the electronic stylus device on the inking surface 108 and, therefore, more accurately render "ink" in the display. The stylus 112 includes one or more deflection sensors to measure the lateral and axial force applied to the stylus tip element. It should be understood that inking refers to rendering ink, pencil, chalk, paint, erasures, smudges and other display artifacts in the display.

In the usage state 102, the electronic stylus device (stylus 112) has a Z-axis (aligned with a long center axis of the stylus 112), and an X-axis ($X_S$) and a Y-axis ($Y_S$) in a plane that is orthogonal to the Z-axis ($Z_S$) of the stylus. The stylus 112 in the usage state 102 is orthogonal to the surface of the inking surface 108. Accordingly, the axial force applied to the stylus tip in usage state 102 is substantially the same in magnitude as the force applied by the stylus tip to the inking surface 108 on the $N_I$ axis. In the illustration of the usage state 102 in FIG. 1, the orthogonal relationship between the stylus 112 and the inking surface 108 results in the rendering of a dark inking path 114 in the inking surface 108.

In the usage state 104, the electronic stylus device (stylus 112) has a Z-axis (aligned with a long center axis of the stylus 112), and an X-axis ($X_S$) and a Y-axis ($Y_S$) in a plane that is orthogonal to the Z-axis ($Z_S$) of the stylus. The stylus 112 in the usage state 104 is at less than a 90° angle (e.g., 70°) with the surface of the inking surface 108. Accordingly, applying geometry to the force vectors, the axial force applied to the stylus tip in usage state 102 is less in magnitude than the force applied by the stylus tip to the inking surface 108 on the $N_I$ axis. Nevertheless, an approximation of the $N_I$ force based on the $Z_S$ force at the stylus is still reasonably accurate, especially with some geometric refinement (e.g., based on the 70° angle to the inking surface 108). Moreover, the approximation can be made even more accurate by including measurement of lateral forces on the stylus tip, to accommodate for frictional forces, variations in tilt and lateral forces applied to the stylus, and other factors. In the illustration of the usage state 104 in FIG. 1, the less-than-orthogonal relationship between the stylus 112 and the inking surface 108 still results in the rendering of a dark inking path 116 in the inking surface 108, albeit potentially less dark in comparison to the usage state 102 given the same magnitude of $Z_S$ axial force (depending on the media and inking modes selected for the operation).

In the usage state 106, the electronic stylus device (stylus 112) has a Z-axis (aligned with a long center axis of the stylus 112), and an X-axis ($X_S$) and a Y-axis ($Y_S$) in a plane that is orthogonal to the Z-axis ($Z_S$) of the stylus. The stylus 112 in the usage state 106 is at much less than a 90° angle (e.g., 20°) with the surface of the inking surface 108 (e.g., to execute a shading exercise). Accordingly, applying geometry to the force vectors, the axial force applied to the stylus tip in usage state 102 is much less in magnitude than the force applied by the stylus tip to the inking surface 108 on the $N_I$ axis. In other words, the $Z_S$ axial force measurement is less representative of the $N_I$ force on the inking surface 108. Therefore, an approximation of the $N_I$ force based solely on the $Z_S$ force at the stylus can be much less accurate using only geometric refinement (e.g., based on the 20° angle to the inking surface 108). Accordingly, the approximation can be made much more accurate by including measurement of lateral forces on the stylus tip, to accommodate for frictional forces, the amplified variations in tilt and lateral forces applied to the stylus, and other factors. In the illustration of the usage state 106 in FIG. 1, the heavily tilted relationship between the stylus 112 and the inking surface 108 results in the rendering of a shading path 120 in the inking surface 108.

Figure 2:
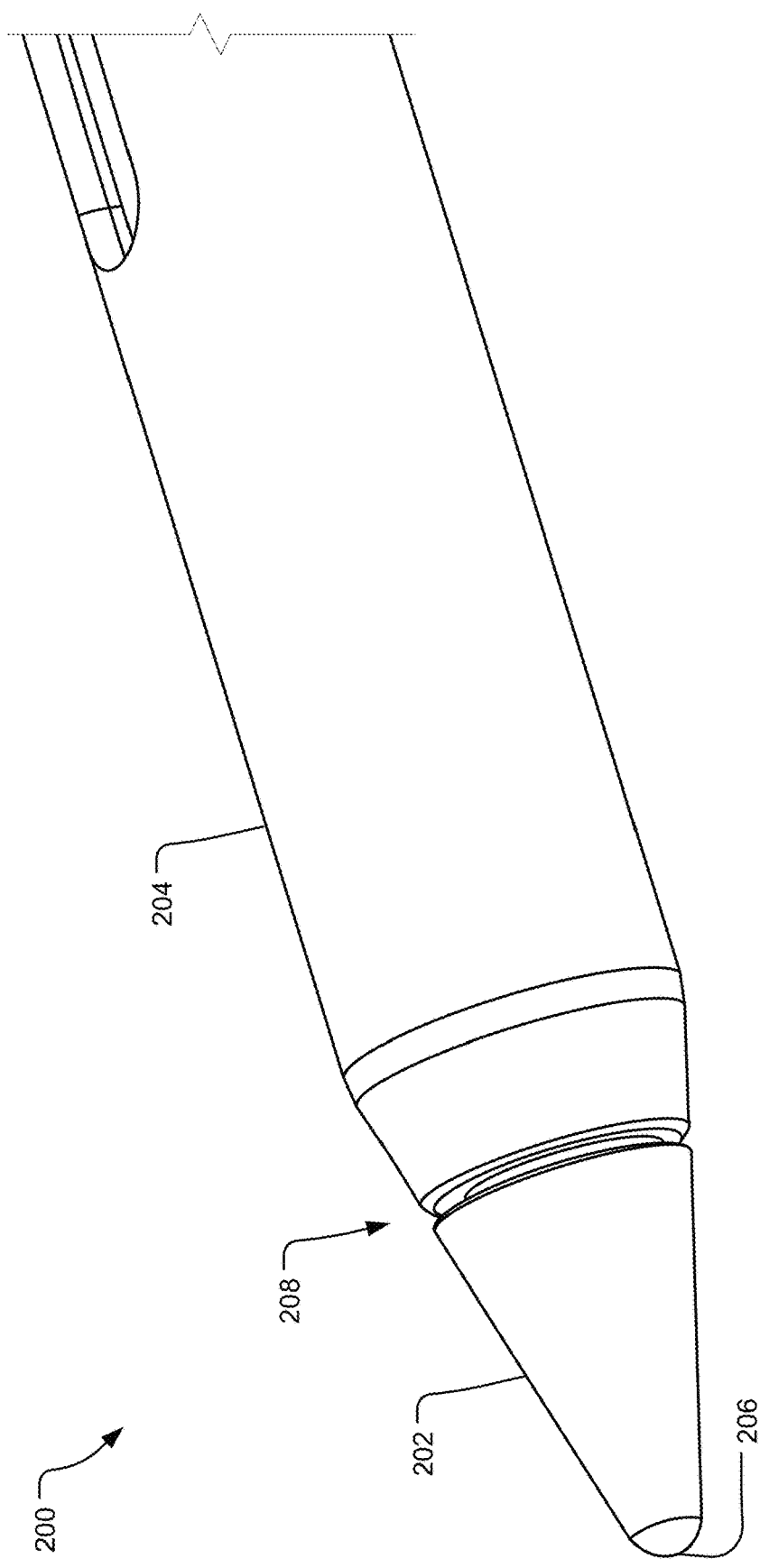
FIG. 2 illustrates an end portion of an example electronic stylus device.

FIG. 2 illustrates an end portion of an example electronic stylus device 200. The electronic stylus device 200 includes a power source (e.g., a battery) and one or more deflection sensors (e.g., a Hall Effect sensor and magnet combination) to measure the lateral and axial force applied to the stylus tip element. Other force sensing technologies may be used.

A stylus tip element 202, which is designed to be put in contact with an inking surface (e.g., like a pen to paper), is movably attached to a body portion 204 of the electronic stylus device 200. The stylus tip element 202 is a load-bearing element that includes a tip end 206 and an opposing end (not shown), which is inserted into the body portion 204 of the electronic stylus device 202. A gap 208 between the body portion 204 and the stylus tip element 202 allows for movement of the stylus tip element 202 relative to the body portion 204.

Figure 3:
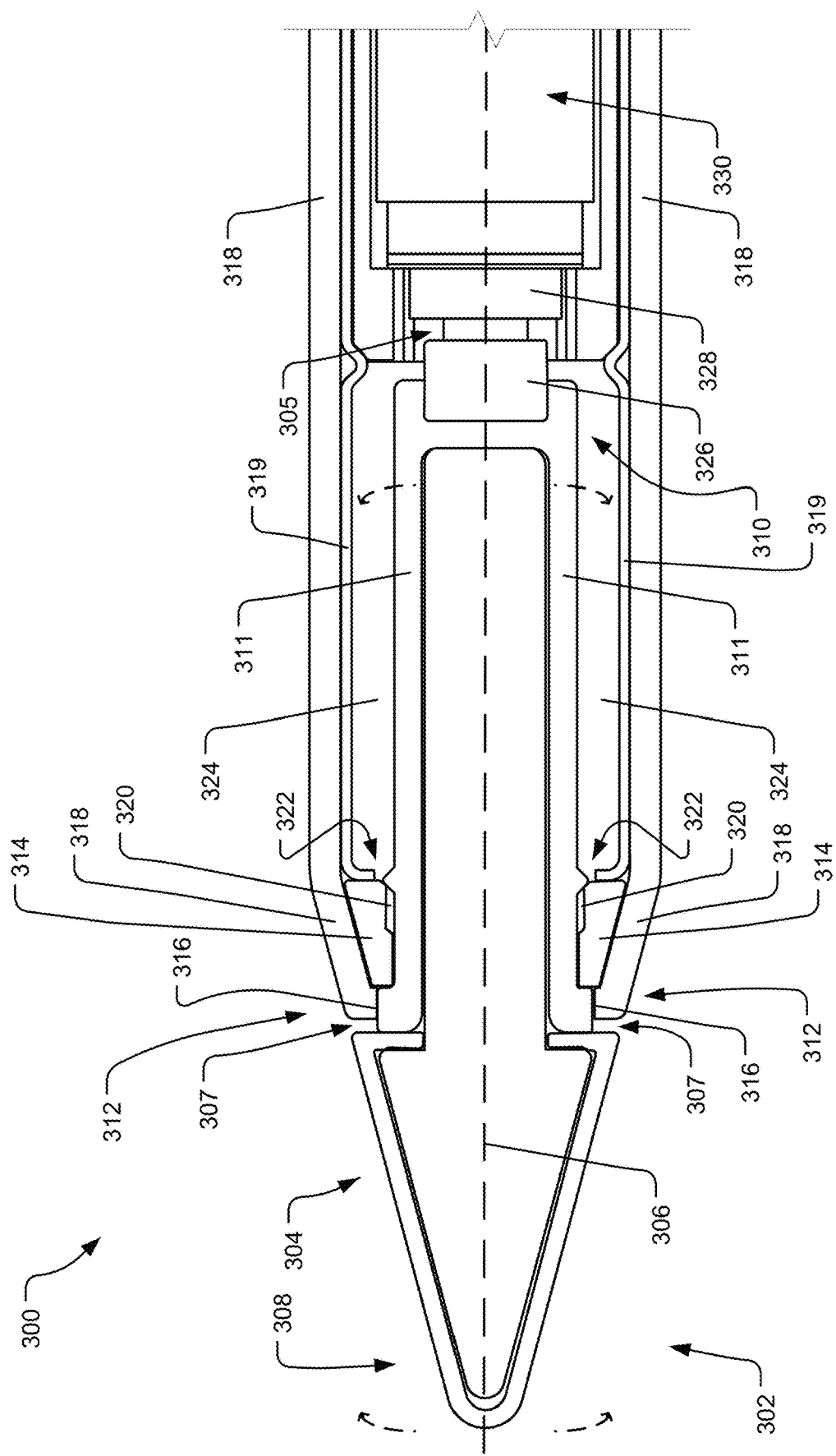
FIG. 3 depicts a cross-sectional view of an end portion of an example electronic stylus device.

FIG. 3 depicts a cross-sectional view of an end portion of an example electronic stylus device 300 having a load-bearing end 302 (with a stylus tip element 304) and an opposing end (not shown). A long center axis 306 extends from the load bearing end 302 to the opposing end of the electronic stylus device 300. In the illustrated implementation, the stylus tip element 304 includes a stylus tip end 308, which is covered by friction tip material to tune the coefficient of friction relative to the inking surface, and an opposing end 310. The opposing end 310 is inserted through a nutation collar 312 along the long center axis 306 into a stylus tip element receiver 311, which is configured to move with the opposing end 310 as lateral force is applied to the stylus tip end 308.

The stylus tip element 304 is positioned within the nutation collar 312 and includes a spring collar 314, one or more load bearing surfaces 316, and a portion of the outer casing 318 of the electronic stylus device 300 so as to allow the stylus tip element 304 to nutate relative to the long center axis 306. In one implementation, the spring collar 314 is formed with one or more compression recesses 320 that facilitate compression of the spring collar 314 as the stylus tip element 304 moves within the nutation collar 312. Accordingly, a lateral movement of the stylus tip end 308 corresponds to an opposite movement of the opposing end 310 (and the stylus tip element receiver 311) relative to the nutation collar 312 (as illustrated using dashed lined arrows at the stylus tip end 308 and the opposing end 310). In this manner, a lateral force on the stylus tip end 308 translates through the nutation collar 312 into a lateral deflection of the opposing end 310 relative to (e.g., off) the long center axis 306. The spring rates of the spring collar 314 can be set to allow predictable translation between lateral deflection and lateral force (see FIG. 5 and the corresponding description).

One or more deflection limiting structures 322 are positioned relative to the stylus tip element 304 to limit the range of nutation of the stylus tip element 304 within the nutation collar 312. Nutation allows lateral deflection of the opposing end 310 relative to (e.g., off) the long center axis 306, with the opposing end 310 and the stylus tip element receiver 311 moving in and out of deflection space 324, subject to the constraints of the limiting structures 322. In one implementation, the one or more deflection limiting structure 322 limit lateral deflection to avoid operation where the spring rate of the spring collar 314 becomes substantially nonlinear (e.g., when the spring collar 314 becomes overly compressed in a given lateral direction). As such, the one or more deflection limiting structures 322 can keep the deflection within a normal use range having a substantially linear spring rate.

In the illustrated implementation, a rigid liner 319 (e.g., formed of sheet metal) is positioned between the outer casing of the electronic stylus device 300 and the deflection space 324. As illustrated, the rigid liner 319 also provides (a) a surface of the deflection limiting structures 322 and (b) a spring collar compression surface (to the right of the spring collar 314 in FIG. 3, which assists in isolating most of the compression space available to the spring collar 314 under compression forces to the one or more compression recesses 320. In alternative implementations, various combinations of other structures may be employed to provide similar functions as these surface structures, if needed.

One or more deflection sensors are positioned at or near the opposing end 310 of the stylus tip element 304 and the stylus tip element receiver 311. In the illustrated implementation, a deflection sensor including a magnet 326 attached along the long center axis to the stylus tip element receiver 311 and Hall Effect sensor 328 attached to the body portion of the electronic stylus device 300 along the long center axis 306. The Hall Effect sensor 328 is powered, controlled, and monitored by a power supply and electronics 330. A Hall Effect sensor detects changes in a magnetic field. In the illustrated implementation, the Hall Effect sensor 328 is fixed on the long center axis 306 detects changes in the magnetic field of the magnet 326 as it laterally deflects relative to the long center axis 306, which results from lateral force on the stylus tip end 308 and the corresponding nutation of the stylus tip element 304. It should be understood that, in other implementations, the magnet 326 could be fixed on the long center axis 306 and the Hall Effect sensor 328 could be laterally deflected relative to the long center axis 306 and the magnet 326 to a similar effect. Other deflection sensor implementations may be alternatively employed, including without limitation capacitive deflection sensors and inductive deflection sensors.

In one implementation, a gap 305 is maintained between the magnet 326 and the Hall Effect sensor 328. The Hall Effect sensor 328 can detect decreases in this gap width, which correspond to a measurable axial force on stylus tip element 304. A related gap 307 between a surface of the stylus tip element 304 and the outer casing 318 provides a structural limit to the axial travel available to the stylus time element 304.

Figure 4:
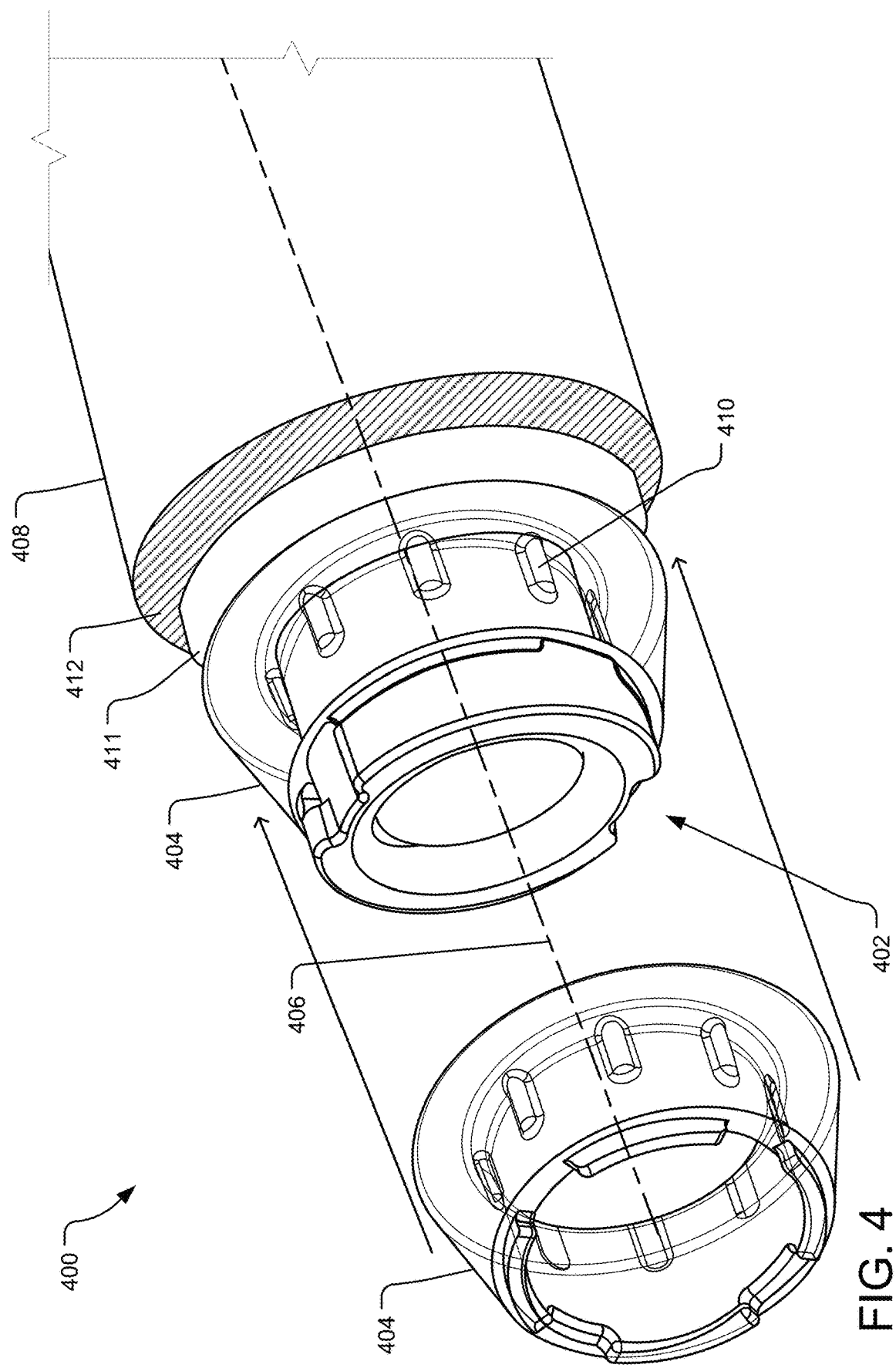
FIG. 4 illustrates an example spring collar for an electronic stylus device.

FIG. 4 illustrates an example spring collar 404 for an electronic stylus device 400. A stylus tip element receiver 402 is inserted along the long center axis 406 into the body portion of the electronic stylus device 400. The spring collar 404 fits over the end of the stylus tip element receiver 402. A rigid liner 411 is shown abutting against the spring collar 404 to provide a compressive surface (see, e.g., the rigid liner 319 in FIG. 3). An outside casing 408 (shown here as cut away at the hashed surface 412) of the electronic stylus device 400 extends over the spring collar 404 to contact and provide an annular load bearing surface at the end of the stylus tip element received 402 (the extension is not shown in FIG. 4 but is shown in FIG. 3). As such, the annular load bearing surface provides a nutation collar about the stylus tip element receiver 402 and the stylus tip element inserted therein.

The spring collar 404 biases the alignment of the stylus tip element and the stylus tip element receiver 402 toward the long center axis 406. The spring rates of the spring collar 404 can be set to allow predictable translation between lateral deflection of the magnet and lateral force applied to the stylus tip end. In addition, in one implementation, the spring collar 404 is formed with one or more compression recesses 410 that facilitate compression of the spring collar 404 as the stylus tip element nutates within the nutation collar.

Figure 5:
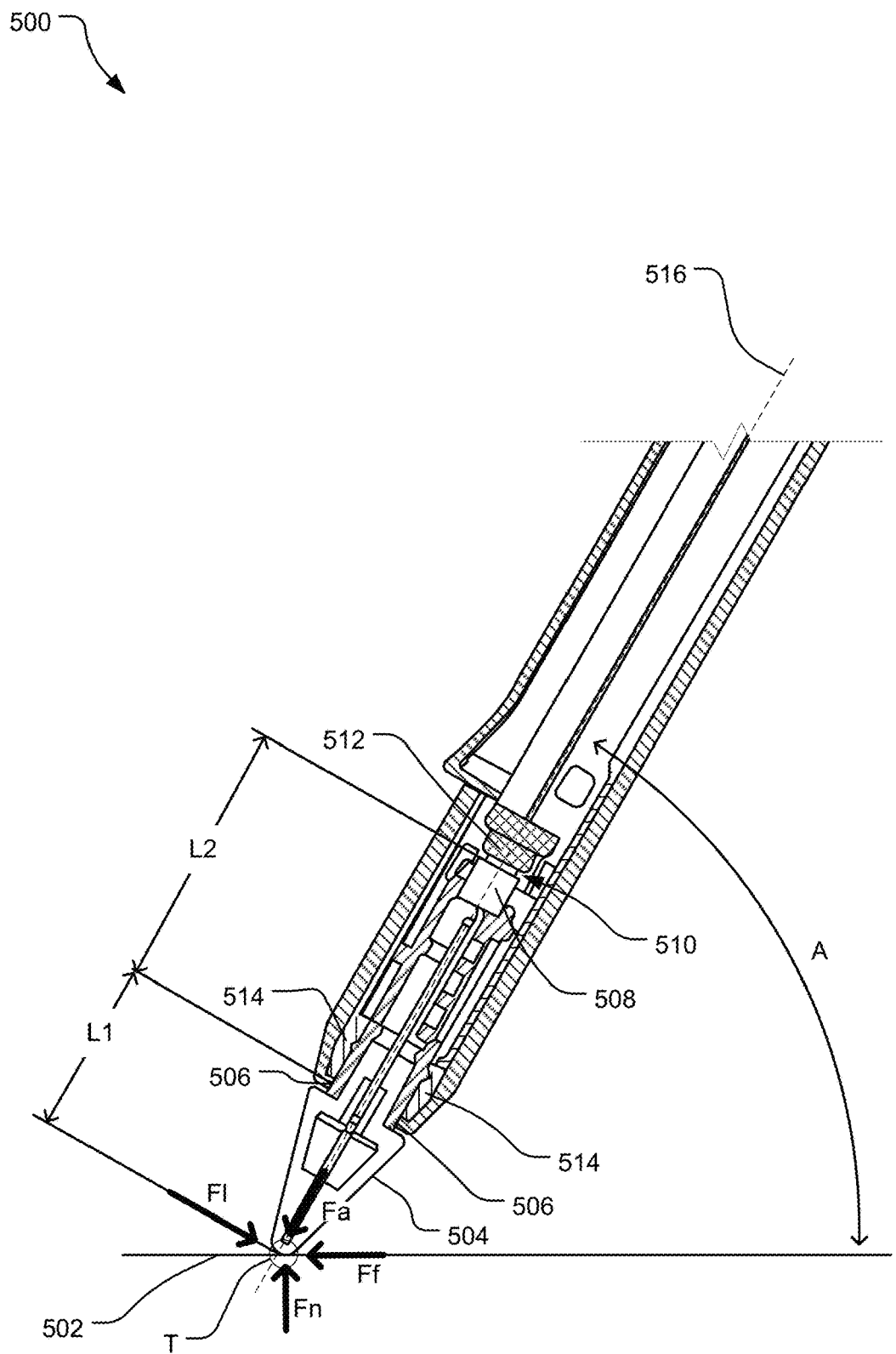
FIG. 5 depicts a cross-sectional view of an end portion of an example electronic stylus device with force vectors shown.

FIG. 5 depicts a cross-sectional view of an end portion of an example electronic stylus device 500 with force vectors Fn, Ff, Fl, and Fa shown. Fn represents a force vector that is normal to the surface of the inking surface 502. Ff represents a frictional force vector at the interface at a circle T between the stylus tip end and the inking surface 502. Fa represents the axial force vector along the long center axis 516 of the electronic stylus device 500. Fl represents the lateral force vector applied to the stylus tip end. These force vectors sum to zero at the point or area shown in the circle T. As such, by computing and/or measuring Fl, Fa, and Ff, the normal force vector Fn, which corresponds to the inking force, may be computed.

The distance from the tip of the stylus tip end 504 to the load bearing surface 506 of the nutation collar is indicated as L1. The distance from the load bearing surface 506 to the distal end of the magnet 508 is indicated as L2. A gap 510 exists between the magnet 508 and a Hall Effect sensor 512 to allow lateral movement of the magnet end of the stylus tip element. A vector of axial deflection of the stylus tip element at the deflection sensor (e.g., reducing the gap 510 distance) is indicated as Da, as measured at the gap 510. A vector of lateral deflection of the opposing end of the stylus tip element at the deflection sensor is indicated as Dl, as measured at the gap 510.

A spring collar 514 biases the lateral deflection of the stylus tip element toward the long center axis of the electronic stylus device 500. The spring rates of the spring collar 514 (such as the axial spring rate SRa and the lateral spring rate SRl of the spring collar) can be set to allow predictable translation between lateral deflection of the magnet and lateral force applied to the stylus tip end.

Given axial and lateral deflection measurements, the lengths L1 and L2, the axial and lateral spring rates, the angle A of the long center axis 516 with the inking surface 502, and the coefficients of friction Cf (whether dynamic or static) between the stylus tip end and inking surface 502, the axial force Fa, the lateral force Fl, the normal force Fn, and the frictional force Ff can be computed relative to the inking surface 502 at the circle T (which may be dependent on whether the interface is static or moving and on the direction of tip movement relative to the inking surface 502), as follows (in one implementation):

$$Ff = Cf * Fn \quad (1)$$

$$Fa = Da * SRa \quad (2)$$

$$Fl = Dl * SRl * L2/L1 \quad (3)$$

$$Fn = Fa * \mathrm{SIN}(A) + Fl * \mathrm{SIN}(90 - A) \quad (4)$$

$$Fa * \mathrm{COS}(A) - Fl * \mathrm{COS}(90 - A) \pm Ff = 0 \quad (5)$$

Note: The polarity of Ff depends on whether the stylus is being pushed or pulled against the inking surface 502

Figure 6:
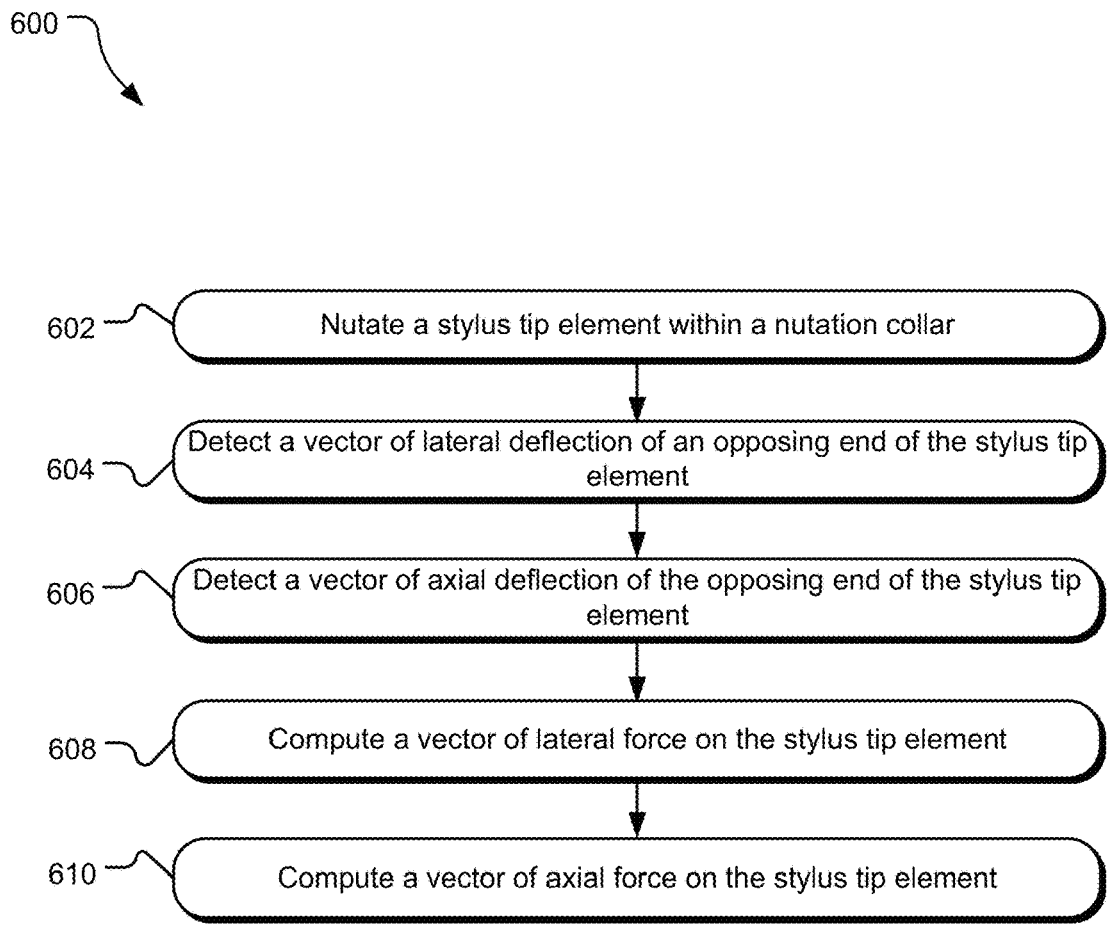
FIG. 6 illustrates example operations for detecting force in an electronic stylus device.

FIG. 6 illustrates example operations 600 for detecting force in an electronic stylus device. A nutation operation 602 nutates a stylus tip element within a nutation collar. The stylus tip element includes a stylus tip end and an opposing end. A detection operation 604 detects a vector of lateral deflection of the opposing end of the stylus tip element (e.g., using a deflection sensor). One example of a deflection sensor includes a Hall Effect sensor and magnet pair. A detection operation 606 detects a vector of axial deflection of the stylus tip element (e.g., also using the deflection sensor).

A computing operation 608 computes a vector of lateral force on the stylus tip element using a processing unit, whether the processing unit is in the electronic stylus device or a separate computing device. A computing operation 610 computes a vector of axial force on the stylus tip element using a processing unit, whether the processing unit is in the electronic stylus device or a separate computing device.

Figure 7:
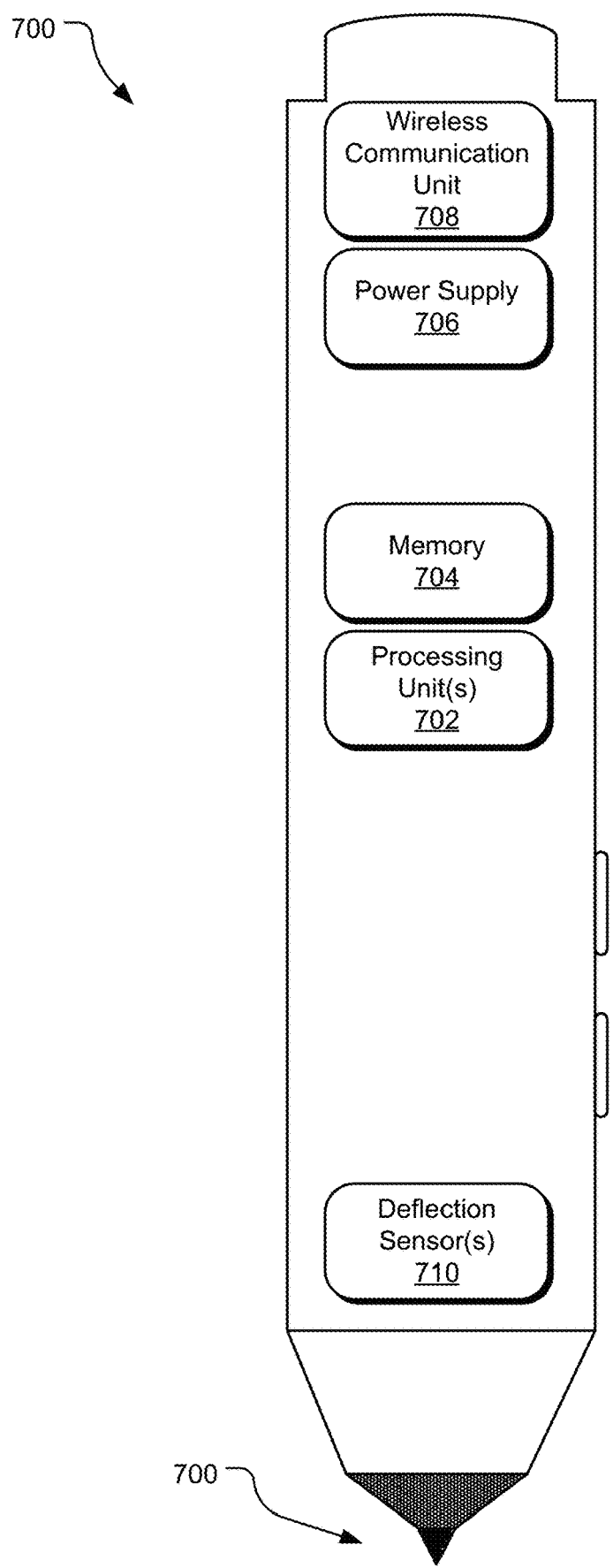
FIG. 7 illustrates an example electronic stylus device.

FIG. 7 illustrates an example electronic stylus device 700. The electronic stylus device 700 includes one or more processing units 702 and a memory 704. The memory 704 generally includes both volatile memory (e.g., RAM) and non-volatile memory (e.g., flash memory). The memory 704 can store firmware and/or software for executing operations of the electronic stylus device. Instructions stored in the memory 704 may instruction the one or more processing units 702 to execute example operations, such as computing lateral and/or axial forces applied to a stylus tip element of the electronic stylus device 700, based on lateral and/or axial deflections of the stylus tip element detected and/or measured by one or more deflection sensors 710.

The electronic stylus device 700 includes a power supply 706, which is powered by one or more batteries or other power sources and which provides power to other components of the electronic stylus device 700. The power supply 706 may also be connected to an external power source that overrides or recharges the built-in batteries or other power sources. The electronic stylus device 700 may include a wireless communication unit 708 to provide communications connectivity to a host computing device providing an inking interface.

The electronic stylus device 700 may include a variety of tangible processor-readable storage media (such as a memory device) and intangible processor-readable communication signals. Tangible processor-readable storage can be embodied by any available media that can be accessed by the electronic stylus device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the electronic stylus device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example implementation of an electronic stylus device includes a first end and a second end aligned along a long center axis of the electronic stylus device. A stylus tip element includes a stylus tip end and an opposing end. The stylus tip element is positioned at the first end of the electronic stylus device and aligned along the long center axis of the electronic stylus device. A nutation collar is positioned about the stylus tip element and the long center axis. The nutation collar provides one or more bearing surfaces around the stylus tip element between the stylus tip end and the opposing end of the stylus tip element. The one or more bearing surfaces permit the stylus tip element to nutate within the nutation collar. A deflection sensor is positioned proximate to the opposing end of the stylus tip element on the long center axis. The deflection sensor is configured to detect a vector of lateral deflection of the opposing end of the stylus tip element relative to the long center axis of the electronic stylus device.

Another example implementation of any preceding electronic stylus device includes a magnet positioned on the long center axis and fixed to the opposing end of the stylus tip element and a Hall Effect sensor positioned proximate to the magnet on the long center axis. The Hall Effect sensor is configured to detect lateral deflection of the magnet relative to the Hall Effect sensor.

Another example implementation of any preceding electronic stylus device includes a spring collar positioned about the stylus tip element and the long center axis, the spring collar being configured to bias the laterally deflected opposing end of the stylus tip element toward the long center axis of the electronic stylus device.

Another example implementation of any preceding electronic stylus device includes a spring collar positioned about the long center axis between the nutation collar and the opposing end of the stylus tip element.

Another example implementation of any preceding electronic stylus device includes a processing unit configured to compute a vector of lateral force applied to the stylus tip element based on the vector of lateral deflection of the opposing end of the stylus tip element relative to the long center axis of the electronic stylus device, responsive to nutation of the stylus tip element within the nutation collar.

Another example implementation of any preceding electronic stylus device is provided wherein the deflection sensor is further configured to detect a vector of axial deflection of the stylus tip element along the long center axis of the electronic stylus device, responsive to nutation of the stylus tip element within the nutation collar.

Another example implementation of any preceding electronic stylus device includes a processing unit configured to compute a vector of axial force applied to the stylus tip element based on the vector of axial deflection of the stylus tip element along the long center axis of the electronic stylus device, responsive to nutation of the stylus tip element within the nutation collar.

An example method of measuring a vector of lateral force applied on a stylus tip element of an electronic stylus device having a first end and a second end aligned along a long center axis of the electronic stylus device includes nutating the stylus tip element within a nutation collar. The stylus tip element includes a stylus tip end and an opposing end. The stylus tip element is positioned at the first end of the electronic stylus and aligned along the long center axis of the electronic stylus device. The nutation collar is positioned about the stylus tip element and the long center axis. The example method further includes detecting a vector of lateral deflection of the opposing end of the stylus tip element relative to the long center axis of the electronic stylus device, responsive to the nutating operation.

Another example method of any preceding method includes computing a vector of the lateral force applied to the stylus tip element based on the vector of lateral deflection of the opposing end of the stylus tip element relative to the long center axis of the electronic stylus device, responsive to the nutating operation.

Another example method of any preceding method includes detecting a vector of axial deflection of the stylus tip element along the long center axis of the electronic stylus device, responsive to the nutating operation.

Another example method of any preceding method includes computing a vector of axial force applied to the stylus tip element based on the vector of axial deflection of the stylus tip element along the long center axis of the electronic stylus device, responsive to the nutating operation.

Another example method of any preceding method includes biasing nutation of the laterally deflected opposing end of the stylus tip element toward the long center axis of the electronic stylus device using a spring collar positioned about the stylus tip element and the long center axis.

Another example method of any preceding method is provided wherein the spring collar is positioned about the long center axis between the nutation collar and the opposing end of the stylus tip element.

An example implementation of an electronic device includes a first end and a second end aligned along a long center axis of the electronic device. A load-bearing element includes a tip end and an opposing end. The load bearing element is positioned at the first end of the electronic device and aligned along the long center axis of the electronic device. A nutation collar is positioned about the load bearing element and the long center axis. The nutation collar provides one or more bearing surfaces around the load bearing element between the tip end and the opposing end of the load bearing element. The one or more bearing surfaces permit the load bearing element to nutate within the nutation collar. A deflection sensor is positioned proximate to the opposing end of the load bearing element on the long center axis. The deflection sensor is configured to detect a vector of lateral deflection of the opposing end of the load bearing element relative to the long center axis of the electronic device.

Another example implementation of any preceding electronic device is provided wherein the deflection sensor includes a magnet positioned on the long center axis and fixed to the opposing end of the load-bearing element and a Hall Effect sensor positioned proximate to the magnet on the long center axis. The Hall Effect sensor is configured to detect lateral deflection of the magnet relative to the Hall Effect sensor.

Another example implementation of any preceding electronic device includes a spring collar positioned about the load bearing element and the long center axis, the spring collar being configured to bias the laterally deflected opposing end of the load-bearing element toward the long center axis of the electronic device.

Another example implementation of any preceding electronic device is provided wherein the spring collar is positioned about the long center axis between the nutation collar and the opposing end of the load-bearing element.

Another example implementation of any preceding electronic includes a processing unit configured to compute a vector of lateral force applied to the load bearing element based on the vector of lateral deflection of the opposing end of the load-bearing element relative to the long center axis of the electronic device, responsive to nutation of the load-bearing element within the nutation collar.

Another example implementation of any preceding electronic device is provided wherein the deflection sensor is further configured to detect a vector of axial deflection of the load-bearing element along the long center axis of the electronic device, responsive to nutation of the load-bearing element within the nutation collar.

Another example implementation of any preceding electronic device includes a processing unit configured to compute a vector of axial force applied to the load-bearing element based on the vector of axial deflection of the load-bearing element along the long center axis of the electronic device, responsive to nutation of the load-bearing element within the nutation collar.

An example system is provided for measuring a vector of lateral force applied on a stylus tip element of an electronic stylus device having a first end and a second end aligned along a long center axis of the electronic stylus device. The example system includes means for nutating the stylus tip element within a nutation collar. The stylus tip element includes a stylus tip end and an opposing end. The stylus tip element is positioned at the first end of the electronic stylus and aligned along the long center axis of the electronic stylus device. The nutation collar is positioned about the stylus tip element and the long center axis. The example system includes means for detecting a vector of lateral deflection of the opposing end of the stylus tip element relative to the long center axis of the electronic stylus device, responsive to the nutatation.

An example system of any preceding system includes means for computing a vector of the lateral force applied to the stylus tip element based on the vector of lateral deflection of the opposing end of the stylus tip element relative to the long center axis of the electronic stylus device, responsive to the nutation.

An example system of any preceding system includes means for detecting a vector of axial deflection of the stylus tip element along the long center axis of the electronic stylus device, responsive to the nutation.

An example system of any preceding system includes means for computing a vector of axial force applied to the stylus tip element based on the vector of axial deflection of the stylus tip element along the long center axis of the electronic stylus device, responsive to the nutatation.

An example system of any preceding system includes means for biasing nutation of the laterally deflected opposing end of the stylus tip element toward the long center axis of the electronic stylus device using a spring collar positioned about the stylus tip element and the long center axis.

An example system of any preceding system is provided wherein the spring collar is positioned about the long center axis between the nutation collar and the opposing end of the stylus tip element.

The implementations described herein are implemented as logical steps in one or more computer systems. The logical operations of the present implementations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. An electronic stylus device having a first end and a second end aligned along a long center axis of the electronic stylus device, the electronic stylus device comprising:
    a stylus tip element having a stylus tip end and an opposing end, the stylus tip element being positioned at the first end of the electronic stylus device and aligned along the long center axis of the electronic stylus device;
    a stylus tip element receiver to receive the opposing end of the stylus tip element;
    a nutation collar positioned about the stylus tip element and the long center axis, the nutation collar providing one or more bearing surfaces around the stylus tip element between the stylus tip end and the opposing end of the stylus tip element, the one or more bearing surfaces permitting the stylus tip element to nutate within the nutation collar;
    a deflection sensor positioned proximate to the opposing end of the stylus tip element on the long center axis, the deflection sensor being configured to detect a vector of lateral deflection of the opposing end of the stylus tip element relative to the long center axis of the electronic stylus device; and
    a spring collar positioned about the stylus tip element and the long center axis and between the nutation collar and the opposing end of the stylus tip element, the spring collar being configured to bias the laterally deflected opposing end of the stylus tip element toward the long center axis of the electronic stylus device.

2. The electronic stylus device of claim 1 wherein the deflection sensor comprises:
a magnet positioned on the long center axis and fixed to the opposing end of the stylus tip element; and
a Hall Effect sensor positioned proximate to the magnet on the long center axis, the Hall Effect sensor being configured to detect lateral deflection of the magnet relative to the Hall Effect sensor.

3. The electronic stylus device of claim 1 further comprising:
a processing unit configured to compute a vector of lateral force applied to the stylus tip element based on the vector of lateral deflection of the opposing end of the stylus tip element relative to the long center axis of the electronic stylus device, responsive to nutation of the stylus tip element within the nutation collar.

4. The electronic stylus device of claim 1 wherein the deflection sensor is further configured to detect a vector of axial deflection of the stylus tip element along the long center axis of the electronic stylus device, responsive to nutation of the stylus tip element within the nutation collar.

5. The electronic stylus device of claim 4 further comprising:
a processing unit configured to compute a vector of axial force applied to the stylus tip element based on the vector of axial deflection of the stylus tip element along the long center axis of the electronic stylus device, responsive to nutation of the stylus tip element within the nutation collar.

6. The electronic stylus device of claim 1 wherein the stylus tip element is fixed in longitudinal position along the long center axis of the electronic stylus device.

7. The electronic stylus device of claim 1 wherein the one or more bearing surfaces around the stylus tip element include a bearing surface between the stylus tip element receiver and an outer casing of the electronic stylus device circumscribing the stylus tip element.

8. A method of measuring a vector of lateral force applied on a stylus tip element of an electronic stylus device having a first end and a second end aligned along a long center axis of the electronic stylus device, the method comprising:
nutating the stylus tip element within a nutation collar, the stylus tip element having a stylus tip end and an opposing end, the stylus tip element being positioned at the first end of the electronic stylus and aligned along the long center axis of the electronic stylus device, the opposing end of the stylus tip element positioned within a stylus tip element receiver, the nutation collar being positioned about the stylus tip element and the long center axis;
biasing nutation of the laterally deflected opposing end of the stylus tip element toward the long center axis of the electronic stylus device using a spring collar positioned about the stylus tip element and the long center axis and between the nutation collar and the opposing end of the stylus tip element; and
detecting a vector of lateral deflection of the opposing end of the stylus tip element relative to the long center axis of the electronic stylus device, responsive to the nutating operation.

9. The method of claim 8 further comprising:
computing a vector of the lateral force applied to the stylus tip element based on the vector of lateral deflection of the opposing end of the stylus tip element relative to the long center axis of the electronic stylus device, responsive to the nutating operation.

10. The method of claim 8 further comprising:
detecting a vector of axial deflection of the stylus tip element along the long center axis of the electronic stylus device, responsive to the nutating operation.

11. The method of claim 10 further comprising:
computing a vector of axial force applied to the stylus tip element based on the vector of axial deflection of the stylus tip element along the long center axis of the electronic stylus device, responsive to the nutating operation.

12. The method of claim 8 wherein the stylus tip element is fixed in longitudinal position along the long center axis of the electronic stylus device.

13. The method of claim 8 wherein the nutation collar includes a bearing surface between the stylus tip element receiver and an outer casing of the electronic stylus device circumscribing the stylus tip element.

14. An electronic device having a first end and a second end aligned along a long center axis of the electronic device, the electronic device comprising:
a load-bearing element having a tip end and an opposing end, the load-bearing element being positioned at the first end of the electronic device and aligned along the long center axis of the electronic device;
a load-bearing element receiver to receive the opposing end of the load-bearing element
a nutation collar positioned about the load-bearing element and the long center axis, the nutation collar providing one or more bearing surfaces around the load-bearing element between the tip end and the opposing end of the load-bearing element, the one or more bearing surfaces permitting the load-bearing element to nutate within the nutation collar;
a deflection sensor positioned proximate to the opposing end of the load: bearing element on the long center axis, the deflection sensor being configured to detect a vector of lateral deflection of the opposing end of the load-bearing element relative to the long center axis of the electronic device; and
a spring collar positioned about the load-bearing element and the long center axis and between the nutation collar and the opposing end of the load-bearing element, the spring collar being configured to bias the laterally deflected opposing end of the load-bearing element toward the long center axis of the electronic device.

15. The electronic device of claim 14 wherein the deflection sensor comprises:
a magnet positioned on the long center axis and fixed to the opposing end of the load-bearing element; and
a Hall Effect sensor positioned proximate to the magnet on the long center axis, the Hall Effect sensor being configured to detect lateral deflection of the magnet relative to the Hall Effect sensor.

16. The electronic device of claim 14 further comprising:
a processing unit configured to compute a vector of lateral force applied to the load-bearing element based on the vector of lateral deflection of the opposing end of the load-bearing element relative to the long center axis of the electronic device, responsive to nutation of the load-bearing element within the nutation collar.

17. The electronic device of claim 14 wherein the deflection sensor is further configured to detect a vector of axial deflection of the load-bearing element along the long center axis of the electronic device, responsive to nutation of the load-bearing element within the nutation collar.

18. The electronic device of claim 17 further comprising:
a processing unit configured to compute a vector of axial force applied to the load-bearing element based on the vector of axial deflection of the load-bearing element along the long center axis of the electronic device, responsive to nutation of the load-bearing element within the nutation collar.

19. The electronic device of claim 14 wherein the load-bearing element is fixed in longitudinal position along the long center axis of the electronic device.

20. The electronic device of claim 14 wherein the one or more bearing surfaces around the load-bearing element include a bearing surface between the load-bearing element receiver and an outer casing of the electronic device circumscribing the load-bearing element.

* * * * *